United States Patent [19]
Louw et al.

[11] 3,853,258
[45] Dec. 10, 1974

[54] FLASH REMOVAL APPARATUS FOR A FRICTION WELDING OPERATION

[75] Inventors: Johan August Louw, Orange; Robert Earle Ghiselin, Newport Beach, both of Calif.

[73] Assignee: Textron, Inc., Santa Ana, Calif.

[22] Filed: July 17, 1972

[21] Appl. No.: 272,520

[52] U.S. Cl.............. 228/2, 29/470.3, 29/475, 90/24 C, 156/73, 228/13
[51] Int. Cl............................................ B23k 27/00
[58] Field of Search.......... 90/24 C, 24 E; 29/470.3, 29/475; 228/2, 13, 19; 219/57, 97; 156/73

[56] References Cited
UNITED STATES PATENTS

| | | | |
|---|---|---|---|
| 3,234,646 | 2/1966 | Hollander et al. | 29/470.3 |
| 3,259,969 | 7/1966 | Tessmann | 219/97 X |
| 3,438,561 | 4/1969 | Calton | 228/13 |
| 3,452,914 | 7/1969 | Oberle et al. | 228/2 |
| 3,662,941 | 5/1972 | Gage | 29/470.3 X |
| 3,712,528 | 1/1973 | Takagi et al. | 29/470.3 X |

FOREIGN PATENTS OR APPLICATIONS

| | | | |
|---|---|---|---|
| 1,425,943 | 3/1965 | France | 228/2 UX |
| 1,589,186 | 4/1970 | France | 228/2 |

Primary Examiner—J. Spencer Overholser
Assistant Examiner—Robert J. Craig
Attorney, Agent, or Firm—Harvey C. Nienow

[57] ABSTRACT

The present disclosure is to a workpiece holder and positioner which is adapted to automatically remove the flash produced during friction welding operation on said workpiece. More specifically, it pertains to apparatus which controls the flash formation to ensure proper automatic removal thereof as part of the friction welding and workpiece removal procedure.

6 Claims, 7 Drawing Figures

PATENTED DEC 10 1974　　3,853,258
FIG.1
FIG.2
FIG.3
FIG.4
FIG.5
FIG.6
FIG.7
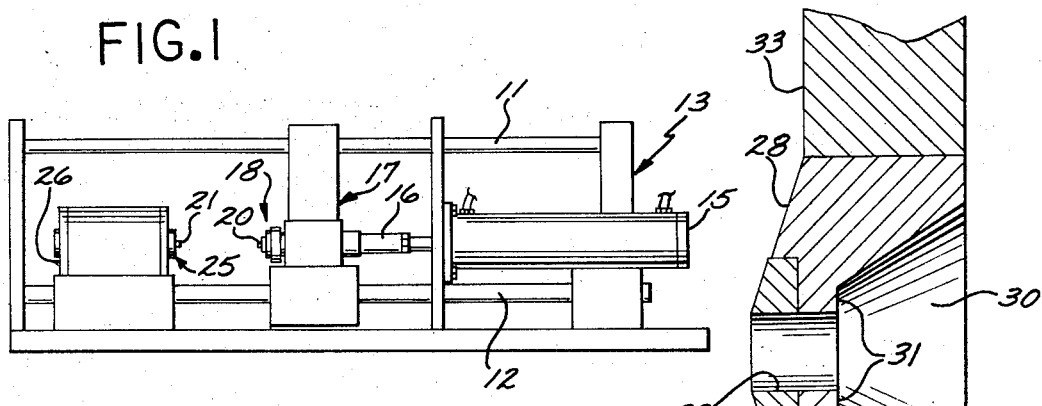
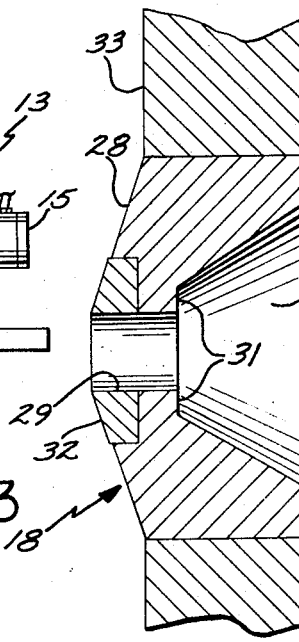
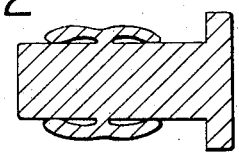
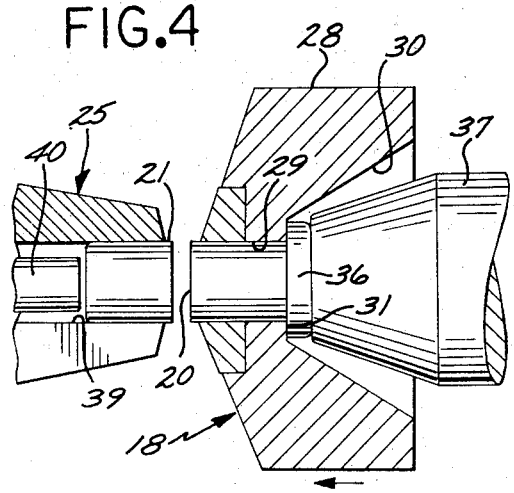
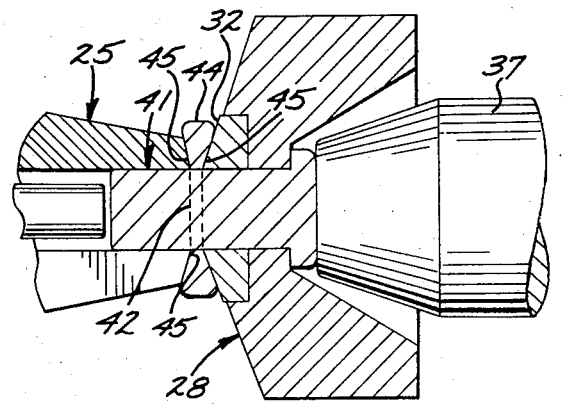
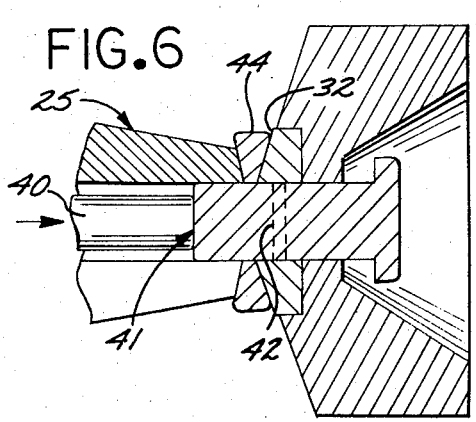
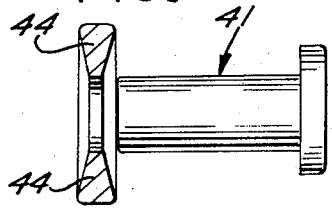

FLASH REMOVAL APPARATUS FOR A FRICTION WELDING OPERATION

The present invention relates generally to friction welding apparatus, and more particularly to apparatus for locating and holding a workpiece, controlling the flash formation from the friction welding operation and then removing the same substantially automatically.

It is well known that quite frequently materials of the same or different characteristics must be bonded together to form a composite structure. Such bonding may take any one of a number of different forms — e.g., clamping, bolting, adhering, welding, etc.

The welding process is often preferred in those cases wherein metallic materials are to be bonded, because the welding process has inherent advantages such as high bond strength, low weight, ease of performing the operation, good reliability, etc. Welding, in general, requires that portions of two workpieces be made plastic or flowable and that the resultant plastic metallic material be permitted to coalesce and solidify to form a composite workpiece.

In order to provide a good weld, it is essential to protect the plastic material and the weld area from contamination. Accordingly, the welding operation is frequently performed in an artificially created atmosphere of an inert gas. Most of these welding conditions can be readily controlled.

However, there are a number of applications wherein another welding method, known as "friction welding," has proved beneficial. Such friction welding procedure will be understood from the following description.

Two workpieces to be "butt welded" together are mounted in a welding apparatus which causes the working pieces to be axially aligned. One of the workpieces is held stationary, and the other workpiece is caused to rotate at a high rate of speed. When the proper rotational speed is attained, which may approach 100,000 revolutions per minute depending upon many factors such as material and size of surface engagement, the workpieces are moved toward each other, until they contact each other. When this occurs, the engagement of the workpieces produces considerable friction at the weld area. This causes the temperature at the interface of the two workpieces to increase appreciably to the point at which the workpieces reach a plastic condition.

With continuous axial pressure on the workpieces as well as the high rotational speed of one of the workpieces, plastic material is squeezed out from between the workpiece. Such displaced material flows outward to form a peripheral annulus of "flash" that surrounds the weld area. This "flash" tends to curl back against the body or shank of the workpiece.

As the composite workpiece cools, the material solidifies and a strong friction weld results to bond together the workpieces into a strong unitary structure. Such friction welding operation takes an extremely short period of time, often on the order of two tenths of a second.

One of the inherent or natural results of the friction welding procedure described above is the presence of the above mentioned flash. Such flash must be removed, and in the past has been machined or ground off. This frequently is too expensive to be practical. Still another method has been to shear off the flash as taught in U.S. Pat. No. 3,438,561 to Mr. R. Calton for "Friction Welding Apparatus with Shearing Tool for Removing Flash Formed During Welding."

As explained above, the flash is formed when the plastic material is squeezed outward as the workpieces are pressed together. As the flash is formed, the outer rim of its annular shape curls over or back onto the body of the workpiece itself. This produces a "curl" having its outer edge adjacent to or in contact with the workpiece. When a shearing tool is employed to remove such "flash," the cutting edge of the tool first engages the outer portions of the flash before reaching that portion of the flash which is attached to the workpiece at the weld. This causes the flash to be bunched together and the flash to be at least partially pulled or torn away from the workpiece. As such, the resultant shearing operation is not as clean and direct as is desired, and the shearing force necessary to accomplish the operation is often excessive.

OBJECTIVES AND DRAWINGS

It is therefore a principal objective of the present invention to provide improved friction welding apparatus.

Another object of the present invention is to provide apparatus as characterized above which is operable to produce improved friction welds.

Another object of the present invention is to provide improved friction welding apparatus as characterized above which is operable to remove the flash resulting from a friction weld.

A further object of the present invention is to provide an improved shearing apparatus as characterized above for facilitating the removal of the flash resulting from the friction weld.

A still further object of the present invention is to provide an improved flash control apparatus for facilitating the removal of flash resulting from a friction weld.

An even further object of the present invention is to provide an improved holding apparatus for holding and positioning a workpiece, and for shaping and shearing the flash resulting from a friction weld on said workpiece.

The novel features which we consider characteristic of our invention are set forth with particularity in the appended claims. The device itself, however both as to its organization and mode of operation, together with additional objects and advantages thereof, will best be understood from the following description of specific embodiments when read in connection with the accompanying drawings, in which:

FIG. 1 is a side elevational schematic view of a typical friction welding apparatus;

FIG. 2 is a sectional view of several workpieces friction welded together, showing the flash formation prior to the instant invention;

FIG. 3 is a fragmentary sectional view of a first workpiece holder for use in the apparatus of FIG. 1;

FIG. 4 is a fragmentary sectional view of first and second workpiece holders, each of which is provided with a workpiece;

FIG. 5 is a fragmentary sectional view similar to FIG. 3 but showing the welding operation and the flash shaping function according to the present invention;

FIG. 6 is a similar fragmentary sectional view showing the ejection operation of the composite workpiece, FIG. 7 is a sectional view showing the final composite workpiece removed from the flash.

Like reference characters indicate corresponding parts throughout the several views of the drawings.

Broadly speaking, the present invention discloses apparatus which automatically shapes the flash produced as a result of a friction welding operation.

The flash removal is achieved by shearing off the flash, but only after the flash has been shaped so as to insure that a clean effective shearing action results. The shearing action is then accomplished automatically as the resultant composite workpiece is ejected from the friction welding apparatus.

INTRODUCTION

As indicated above, a friction weld is produced by friction heating which results from engagement of two workpieces, one of which is stationary and the other of which is rotating at a high rate of speed. Typical apparatus for accomplishing this is schematically illustrated in FIG. 1. The friction welding apparatus shown therein comprises a base 10 having a plurality of guides, such as shown at 11 and 12, which define the longitudinal sliding movements of a welding sub-assembly 13.

Sub-assembly 13 comprises a hydraulic cylinder 15, or the like, having a compound piston 16 capable of providing longitudinal movement relative to base 10. One portion of the compound piston 16 is affixed to a slidable assembly 17 which comprises a holding fixture 18 that will be more fully discussed later. As indicated in FIG. 1, the slidable assembly 17 and the holding fixture 18 are adapted to be moved longitudinally along suitable guides 11 and 12 by the action of the hydraulic cylinder 15 and its piston 16.

Holding fixture 18 is adapted to hold a first workpiece 20 which is to be friction welded to a second workpiece 21. In the present illustration, the first workpiece holder 18 holds the first workpiece 20 in a non-rotating manner. As may be understood from the above description and from the various views of the drawings, the first workpiece 20 may be advanced toward, and retracted from, the second workpiece 21 by suitable activation of the hydraulic cylinder 15.

The second workpiece 21 is mounted in a second workpiece holder 25 which may be part of the rotating armature of a motor 26 of any appropriate type — e.g., electric, hydraulic, pneumatic, etc. — which is capable of attaining the necessary rotational speed.

The friction welding operation, as discussed above, comprises the steps of causing one of the workpieces (the second workpiece 21 in the illustrated case) to attain a predetermined rate of rotational speed, and then causing it to engage the other workpiece (the first workpiece 20 in the illustrated case) while the latter is held in a non-rotating position. This engagement is achieved, in the illustrated case, by advancing the first workpiece holder 18 toward the second workpiece holder 25, until the desired axial pressure is established between the several workpieces 20 and 21. The resulting contact of the relative rotating workpieces produces a considerable amount of heat at the interface of the workpieces such that the material thereat becomes plastic. When a suitable combination of friction welding conditions (temperature, pressure, time, materials, etc.) is obtained, the relative rotation is terminated and the weld is permitted to cool so that the plastic material solidifies to form a strong weld that consolidates the two workpieces into a unitary structure.

DISCLOSURE

As indicated above, the out flow of material at the weld during the friction welding operation produces a curled annular flash configuration which, in most cases, must be removed. In accordance with the present invention, the flash is removed automatically by the use of the following apparatus.

The First Workpiece Holder

Referring to FIG. 3 of the drawings, there is shown therein a cross sectional view of the first workpiece holder 18 which was discussed in connection with FIG. 1. In the past, such workpiece holder 18 often took the form of an expansible and contractable "collett" or "chuck" as utilized in many machine tools for holding a tool or workpiece.

The present invention dispenses with the use of such a workpiece holder, and instead uses a block 28 formed with an axial bore 29 whose diameter, cross sectional, tolerance, etc. are suitable for receiving the first workpiece 20 (not shown in FIG. 3). Block 28 of FIG. 3 is formed with an aperture 30 which communicates with axial bore 29 and whose sides form annular shoulder area 31. The function of block 28 will be discussed later.

Workpiece holder 18 of FIG. 3 preferably has an insert 32 which is formed of relatively hard heat resistant material and is positioned within an annular recess in block 28. The function of insert 32 also will be discussed more fully hereinafter.

It is desirable for the workpiece holder 18 to be mounted on a support 33 which can be affixed to one portion of the previously discussed compound piston for imparting longitudinal movement to the workpiece holder 18.

While many frictional welding operations unite identical or similar materials, it is often desirable to unify two dissimilar workpieces into a unitary composite workpiece.

As is well known, an ordinary rivet comprises a head portion, a body portion, and an end portion. In some cases, a special requirement makes it desirable if not necessary to make certain portions of the rivet out of a particular material to provide certain critical characteristics such as strength, ductility and the like at such portions. More specifically, it might be necessary for the body portion of the rivet to be hard and unusually strong while the end portion is more ductile and formable so that it can be readily "upset" to clench the rivet in place. Thus, for such optimum design features the rivet should be formed of different materials at the various locations to provide the different characteristics.

The Workpiece Holding Operation

As suggested above, the workpiece holder 18 is adapted to hold the first workpiece 20, as shown most clearly in FIG. 4. Here, it will be seen that workpiece 20 is shown to comprise a portion which is received within the axial bore 29, and a head 36 which is received within the aperture 30 of holding fixture 18. As shown, the head 36 engages the shoulder portion 31 of aperture 30.

A holding ram 37 is pressed against the end surface of the rivet head to apply an axial force to hold the rivet head portion in place. Thus, the first workpiece 20 is securely held in place.

In this way, the present invention avoids the need for an expansible workpiece holder such as a chuck or collet. Moreover, the present invention permits the workpiece 20 to be long or short, since its longitudinal surface is not used for the workpiece holding operation.

The Second Workpiece Holder

FIG. 4 also shows the second workpiece holder 25 used for holding the second workpiece 21. Such workpiece 21 is shown as a rivet end portion within an opening 39 of which is gripped or clamped holder 25. Within the context of the present invention, holder 25 may take substantially any desired form of construction as amply taught by the prior art.

The Friction Welding Operation

The friction welding operation may be understood from FIG. 4. When the motor 26 is energized, its rotation imparts a rotation to the second workpiece holder 25 as well as the rivet end portion 21. When end portion 21 is rotated at the desired speed, the first workpiece holder 18 and its workpiece 20 are advanced toward the second workpiece 21 as indicated by the arrow of FIG. 4. Eventually, such workpieces are caused to contact each other and the above described friction welding operation produces a composite unitary workpiece.

One result of the disclosed friction welding operation is shown in FIG. 5. The composite workpiece 41 has a solidified weld portion 42 which unites the several workpieces.

FIG. 5 also illustrates the annular flash 44 which is produced by the outflow of the material during the friction welding operation. The flash 44 as shown in FIG. 5 is shaped into an upstanding erect non-curled annulus. This formation results from the cooperation of the conically shaped ends of the second workpiece holder 25 and the insert 32 of holder 28. In this way, the prior art curled over flash is obviated, to facilitate removal of the flash as will be discussed more fully hereinafter. Thus, the desired flash configuration is automatically provided as part of the friction welding operation.

Under some conditions, only one side of the flash need be shaped and, under certain other conditions, the shaping function of insert 32 may be provided by a surface of block 28.

Flash Removal

In accordance with the present invention, the flash 44 resulting from the friction welding operation is automatically removed by a shearing function which is an inherent part of the step of ejecting the composite workpiece 41 from the welding apparatus.

As shown in FIG. 6, the holding ram 37 is withdrawn by the compound piston 15. Chuck or collet 25 is then loosened to free the workpiece from its clamping function. An ejection plunger 40 is then advanced in the direction of the arrow in FIG. 6. Eventually it moves the composite workpiece 41 to the right to cause the insert 32 to shear off the annular flash 44.

As shown in the drawings, the intentionally weak neck portion 45 is close to the body of the workpiece 41, so that the shearing action is completed with minimal force. Moreover, since the flash is disposed away from the body of workpiece 41, the shearing edge of insert 32 is operable to cut or shear the flash rather than to tear or pull the flash from the body of workpiece 41. This produces a high quality workpiece 41 which requires little additional time and effort for machining, or finishing.

Thus, the ejection plunger simultaneously (A) removes the rivet 41 from holder 28, and (B) shears off the flash 44 in a clean efficient manner. For this reason, insert 32 is preferably formed of hard, heat resistant material which is capable of retaining a cutting edge which is sharp and long lasting.

It is apparent that the workpiece may have substantially any cross sectional shape, size or length and may be formed of materials having any desired weld temperatures, flash characteristics, etc. Thus, the disclosed invention permits easy friction welding and flash removal for many types of workpieces.

SUMMARY

The disclosed friction welding apparatus has a number of important advantages over prior art friction welding techniques. First of all, the flash is automatically shaped as the flash is produced. Second, such flash is prevented from assuming the prior art position adjacent the resulting workpiece. Third, the flash shaping or control process may be used to produce flash which is weak in a predetermined area. Fourth, the flash shape control operation does not require any additional time or process steps. Fifth, the disclosed friction welding apparatus provides automatic flash removal. Sixth, such automatic flash removal is a shearing action which is efficiently performed at a predetermined weak portion so as to require minimal shearing force. Seventh, such automatic flash removal is a close tolerance operation which produces a high quality product. Eighth, the disclosed flash removal operation does not require additional time or processing steps. Ninth, the flash shaping and flash removal are both automatic. Tenth, the apparatus for achieving flash shaping and flash removal are inherent in the disclosed friction welding apparatus. And, finally, the disclosed apparatus permits the resultant composite workpiece to be produced more economically than by prior art devices.

What is claimed is:

1. In a friction welding apparatus for friction welding a first workpiece to a second workpiece to form a unitary structure:

a first workpiece holder formed to receive a first workpiece;

said first workpiece holder having a flash controlling surface and a shearing edge adjacent to said first workpiece;

means forming a shoulder on said first workpiece holder;

a holding member adapted to hold a portion of said first workpiece against said shoulder;

a second workpiece holder adapted to receive a second workpiece;

said second workpiece holder having a second flash controlling surface for cooperation with said first flash controlling surface to form a cavity for the flash resulting from said frictional welding operation;

and means including an ejection plunger for ejecting said unitary structure from said workpiece holders;

said ejection plunger being adapted to move said structure and said flash in such a direction as to cause said shearing edge to shear off said flash as said structure is ejected from said first workpiece holder.

2. In a friction welding apparatus for friction welding a first workpiece to a second workpiece to form a unitary structure:
a first workpiece holder formed with an opening adapted to receive a first workpiece;
said first workpiece holder having a flash controlling surface and a shearing edge adjacent to said first workpiece;
means forming a shoulder on said first workpiece holder at one end of the opening therein;
a holding ram adapted to hold a portion of said first workpiece against said shoulder;
a second workpiece holder adapted to receive a second workpiece;
said second workpiece holder having a second flash controlling surface for cooperation with said first flash controlling surface to form an annular cavity for the flash resulting from said frictional welding operation;
and means including an ejection plunger for ejecting said unitary structure from said workpiece holders;

said ejection plunger being adapted to move said structure and said flash in such a direction as to cause said shearing edge to shear off said flash as said structure is ejected from said first workpiece holder.

3. In a friction welding apparatus for friction welding a first workpiece to a second workpiece to form a unitary structure:
a first workpiece holder formed to receive a first workpiece;
said first workpiece holder having a flash controlling surface and a shearing edge adjacent to said first workpiece;
means forming a shoulder on said first workpiece holder;
a hydraulically operated holding ram adapted to hold a portion of said first workpiece against said shoulder;
a second workpiece holder adapted to receive a second workpiece;
said second workpiece holder having a second flash controlling surface for cooperation with said first flash controlling surface to form an annular cavity for the flash resulting from said frictional welding operation;
and means including a hydraulically operated ejection plunger for ejecting said unitary structure from said workpiece holders;
said ejection plunger being adapted to hydraulically move said structure and said flash in such a direction as to cause said shearing tool to shear off said flash as said structure is ejected from said first workpiece holder.

4. In a friction welding apparatus for friction welding a first workpiece to a second workpiece to form a unitary structure.
a first workpiece holder formed with an opening adapted to receive a first workpiece;
said first workpiece holder having a flash controlling surface adapted to shape the flush resulting from said friction welding operation;
said first workpiece holder also having a shearing tool adapted for shearing off said flash;
said flash controlling surface and said shearing tool being a unitary insert of said first workpiece holder positioned about said opening and having a shearing edge adjacent to said first workpiece;
means forming an annular shoulder on said first workpiece holder about one end of the opening therein;
a holding ram adapted to hold a portion of said first workpiece against said shoulder;
a second workpiece holder adapted to receive a second workpiece;
said second workpiece holder having a second flash controlling surface for cooperation with said first flash controlling surface to form an annular cavity for the flash resulting from said frictional welding operation to cause the same to be formed into a substantially coplanar annulus at substantially right angles to said workpieces;
said second flash controlling surface being positioned about said second holder;
means including an ejection plunger for ejecting said unitary structure from said workpiece holders;
said ejection plunger being adapted to move said structure and said flash in such a direction a to cause said shearing tool to shear off said flash as said structure is ejected from said first workpiece holder.

5. In a friction welding apparatus for friction welding a first workpiece to a second workpiece to form a unitary structure according to claim 4 wherein said means including an ejection plunger comprises hydraulic means operable as desired to cause said plunger to eject and shear said unitary structure.

6. In a friction welding apparatus for friction welding a first workpiece to a second workpiece to form a unitary structure according to claim 5 wherein said annular cavity between said flash controlling surfaces on said first and second holders is shaped so that the flash has a relatively thin cross section adjacent said workpieces to minimize the shearing force required.

* * * * *